(12) United States Patent
Wobben

(10) Patent No.: US 6,965,174 B2
(45) Date of Patent: Nov. 15, 2005

(54) METHOD FOR OPERATING A WIND TURBINE

(76) Inventor: Aloys Wobben, Argestrasse 19, Aurich (DE), 26607

( * ) Notice: Subject to any disclaimer, the term of this patent is extended or adjusted under 35 U.S.C. 154(b) by 0 days.

(21) Appl. No.: 10/475,731

(22) PCT Filed: Apr. 22, 2002

(86) PCT No.: PCT/EP02/04384

§ 371 (c)(1),
(2), (4) Date: May 10, 2004

(87) PCT Pub. No.: WO02/086315

PCT Pub. Date: Oct. 31, 2002

(65) Prior Publication Data

US 2004/0178639 A1 Sep. 16, 2004

(30) Foreign Application Priority Data

| Apr. 24, 2001 | (DE) | 101 20 212 |
| Jul. 28, 2001 | (DE) | 101 36 974 |

(51) Int. Cl.$^7$ .................................................. H02J 3/00
(52) U.S. Cl. ........................... 290/44; 290/55; 323/211
(58) Field of Search ...................... 290/44, 55; 323/211

(56) References Cited

U.S. PATENT DOCUMENTS

| 3,987,359 A | * | 10/1976 | Thompson | 323/211 |
| 4,068,159 A | * | 1/1978 | Gyugyi | 323/211 |

(Continued)

FOREIGN PATENT DOCUMENTS

| DE | 197 56 777 A1 | 7/1999 | |
| DE | 100 19 362 A1 | 10/2001 | |
| DE | 100 59 018 A1 | 6/2002 | |
| EP | 280876 A1 * | 9/1988 | H02P/9/44 |
| EP | 0 899 638 A2 | 3/1999 | |
| JP | 2000041338 A * | 2/2000 | H02J/3/38 |
| WO | WO 93/11604 | 6/1993 | |
| WO | WO 01/25630 A1 | 4/2001 | |
| WO | WO 01/73518 A1 | 10/2001 | |

OTHER PUBLICATIONS

Jones, R. et al., "High Quality Mains Power from Variable-Speed Wind Turbines," *Wind Engineering* 18(1):45–50, 1994.

(Continued)

Primary Examiner—Joseph Waks
(74) Attorney, Agent, or Firm—Seed IP Law Group PLLC

(57) ABSTRACT

The present invention relates to a method for operating a wind turbine with an electrical generator, drivable by a rotor, for supplying electrical power to an electric grid, in particular to the loads connected thereto. The object of the present invention is to define a method for operating a wind turbine and to provide a wind turbine and/or a wind farm that is capable, even when the output of non-reactive power fluctuates, of reducing or at least of insignificantly increasing the unwanted fluctuation in voltage at a predefined point in the grid compared to the situation with no wind turbine(s). Method for operating a wind turbine with an electrical generator, drivable by a rotor, for supplying electrical power to an electric grid, in particular to the loads connected thereto, characterized in that the phase angle φ is changed in response to at least one voltage measured in the grid.

A method for operating a wind turbine and to provide a wind turbine and/or a wind farm that is capable, even when the output of non-reactive power fluctuates, of reducing or at least of insignificantly increasing the unwanted fluctuation in voltage at a predefined point in the grid compared to the situation with no wind turbines. Method for operating a wind turbine with an electrical generator, drivable by a rotor, for supplying electrical power to an electric grid, in particular to the loads connected thereto, characterized in that the phase angle φ is changed in response to at least one voltage measured in the grid.

10 Claims, 3 Drawing Sheets

U.S. PATENT DOCUMENTS

| | | | | | |
|---|---|---|---|---|---|
| 4,093,908 | A | * | 6/1978 | Evans | 323/300 |
| 5,225,712 | A | * | 7/1993 | Erdman | 290/44 |
| 5,798,632 | A | * | 8/1998 | Muljadi | 322/29 |
| 6,026,793 | A | | 2/2000 | Yasui et al. | 123/674 |
| 6,137,187 | A | * | 10/2000 | Mikhail et al. | 290/44 |
| 6,304,468 | B2 | * | 10/2001 | Ichinose et al. | 363/55 |
| 6,420,796 | B1 | * | 7/2002 | Lagerwey | 290/44 |
| 6,563,234 | B2 | * | 5/2003 | Hasegawa et al. | 307/66 |
| 6,566,784 | B1 | * | 5/2003 | Hsu | 310/254 |
| 6,670,721 | B2 | * | 12/2003 | Lof et al. | 290/44 |
| 6,703,718 | B2 | * | 3/2004 | Calley et al. | 290/44 |
| 6,784,564 | B1 | | 8/2004 | Wobben | 290/44 |
| 2004/0027095 | A1 | | 2/2004 | Wobben | 322/20 |

OTHER PUBLICATIONS

Verdelho, P., "Voltage Type Reversible Rectifiers Control Methods in Unbalanced and Non–sinusoidal Conditions," in *Proceedings of the 24th Annual Conference of the IEEE*, Industrial Electronics Society, Aug. 31–Sep. 4, 1998, vol. 31, pp. 479–484.

"Himmlische Kräfte," *SKF–Evolution*, pp. 1–3, Feb. 1998.

"Die keistung Optimal Nutzen," *In: Elektrotechnik*, issue 20, pp. 16–18, 1981.

Heier, S., "Grid Integration of Wind Energy Conversion Systems," p. 118; published Nov. 1998 by John Wiley and Sons, XP–002305208.

* cited by examiner

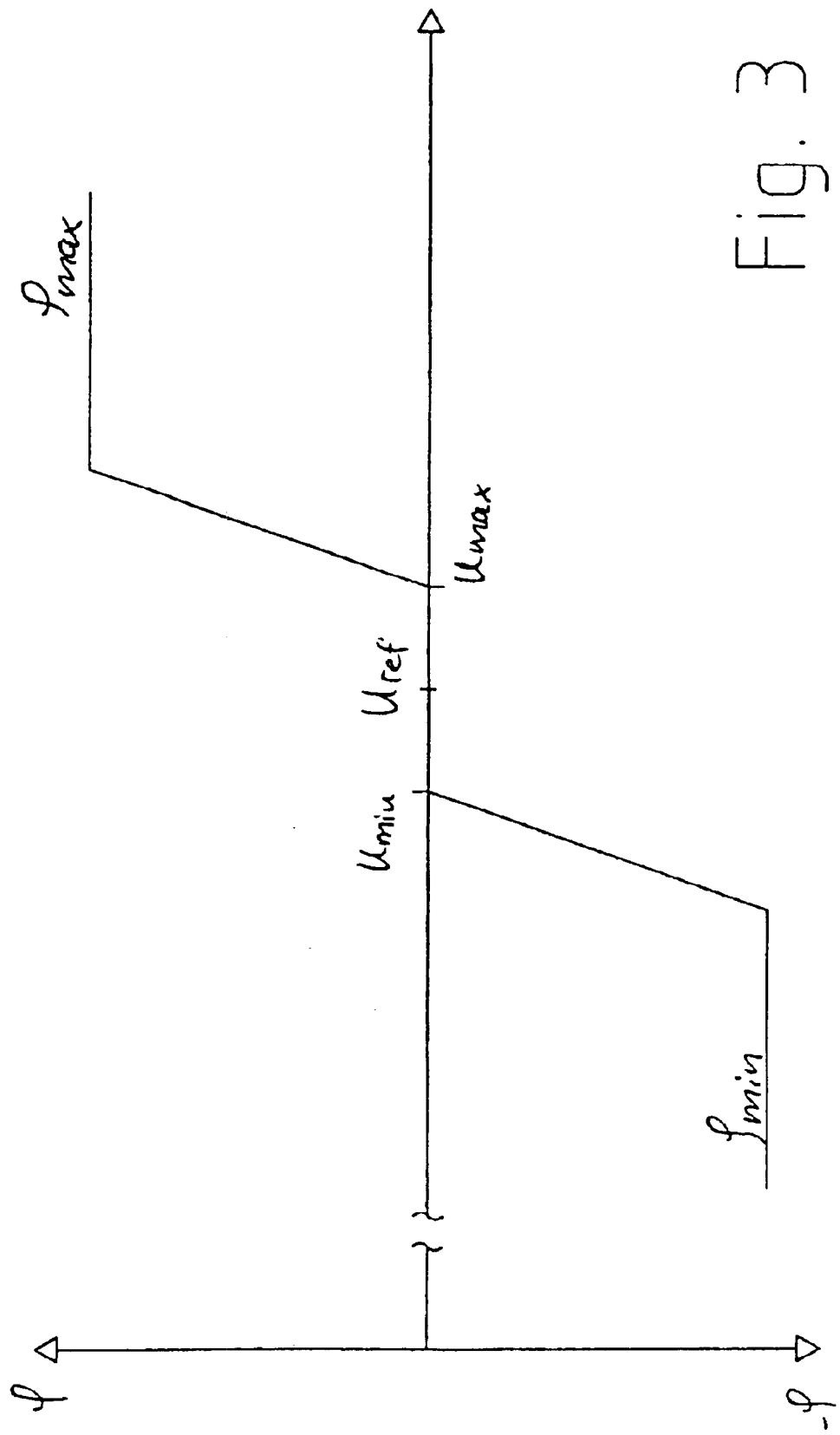

METHOD FOR OPERATING A WIND TURBINE

TECHNICAL FIELD

The present invention relates to a method for operating a wind turbine with an electrical generator, drivable by a rotor, for supplying electrical power to an electric grid, in particular to the loads connected thereto.

The present invention further relates to a wind turbine, in particular for implementing such an aforementioned method, comprising a rotor and an electrical generator coupled to the rotor for supplying electrical power to an electrical grid, and to a wind farm comprising at least two wind turbines.

BACKGROUND OF THE INVENTION

In known wind turbines for generating electrical energy from wind energy, the generator with an electrical load, often an electric grid, is operated in a grid-parallel mode. During operation of the wind turbine, the electrical non-reactive power provided by the generator may vary according to the current wind speed. This results in a situation in which the grid voltage, for example at the infeed point, can also vary according to the current wind speed.

However, when the electrical power generated is delivered to an electric grid, for example a public power grid, fluctuations in the grid voltage may ensue as a consequence. In connected loads are to be operated reliably, however, such fluctuations are permissible only within very narrow limits.

Larger deviations from the reference value for the grid voltage in the supply grid, in particular the medium high voltage level, may be compensated, for example, by actuating switching devices such as stepping transformers, by actuating the latter when actual values exceed or fall short of predetermined threshold values. In this way, the grid voltage is kept substantially constant within predefined tolerance limits.

SUMMARY OF THE INVENTION

The object of the present invention is to define a method for operating a wind turbine and to provide a wind turbine and/or a wind farm that is capable, even when the output of non-reactive power fluctuates, of reducing or at least of insignificantly increasing the unwanted fluctuation in voltage at a predefined point in the grid compared to the situation with no wind turbine(s).

The invention achieves the object with a method of the kind initially specified, with which the phase angle $\phi$ of the electrical power output supplied by the wind turbine(s) is changed according to at least one voltage measured in the grid.

In a wind turbine of the kind initially specified, the object is achieved by a device that is capable of executing the method of the invention.

In a wind farm of the kind initially specified, the object of the invention is achieved by the wind farm having, for each separately controllable section of the wind farm, at least one device capable of executing the method of the invention, and a voltage sensing device.

The invention avoids undesired fluctuations in the voltage supplied to the load, in particular in the voltage in a grid, by changing the phase angle of the supplied power according to the voltage of the load or the grid. This compensates any undesired voltage fluctuations arising from changes in the non-reactive power supplied by the wind turbine(s) and/or in the power drawn from the grid by the loads.

It is particularly preferred that the phase angle be changed in such a way that the voltage remains substantially constant at at least one predefined point in the grid. In order to determine the required parameter values, the voltage must be measured at at least one point in the grid.

In particular, said point may be different to the infeed point. By measuring the voltage in this way and by suitably changing the phase angle of the electrical power supplied by the wind turbine(s), fast-response and efficient regulation of power delivery can be achieved.

In one particularly preferred embodiment, the value to be set for the phase angle $\phi$ is derived from predefined parameter values. Said parameter values may preferably be provided as a table containing a predetermined family of characteristics in the form of discrete values that permit derivation of the phase angle to be set.

In one preferred development of the invention, the regulation system can directly or indirectly cause the voltage to be brought back to within the tolerance range by actuating a switching device in the grid, for example a stepping transformer, when the voltage fluctuations have exceeded the predefined threshold values. Simultaneously and additionally, the phase angle is set for a predetermined period to a constant value—preferably a mean value, such as zero—so that, by suitably adjusting the phase angle, it is possible to compensate any voltage fluctuations that subsequently arise.

In a particularly preferred development of the invention, voltage measurements and adjustments of the phase angle can be performed separately in electrically separate portions of the grid, in order to regulate each portion in such a way that the voltage in each of said portions remains substantially constant.

The wind turbine according to the invention is advantageously developed by a regulating device comprising a microprocessor, since this enables digital regulation of the wind turbine.

The wind farm mentioned at the outset is preferably developed by providing, for each separately controllable section of the wind farm, a voltage measurement device and a device capable of performing the method according to the invention, so that electrically disconnected portions of the grid can be separately regulated in such a way that the voltage remains substantially constant in each portion of the power grid.

BRIEF DESCRIPTION OF THE DRAWINGS

The invention will now be described with reference to the drawings and on the basis of an embodiment of a method for operating a wind turbine. The figures show:

FIG. 3 a view showing the inter-relationship between the grid voltage and the phase angle;

DETAILED DESCRIPTION OF THE INVENTION

Figure 1:
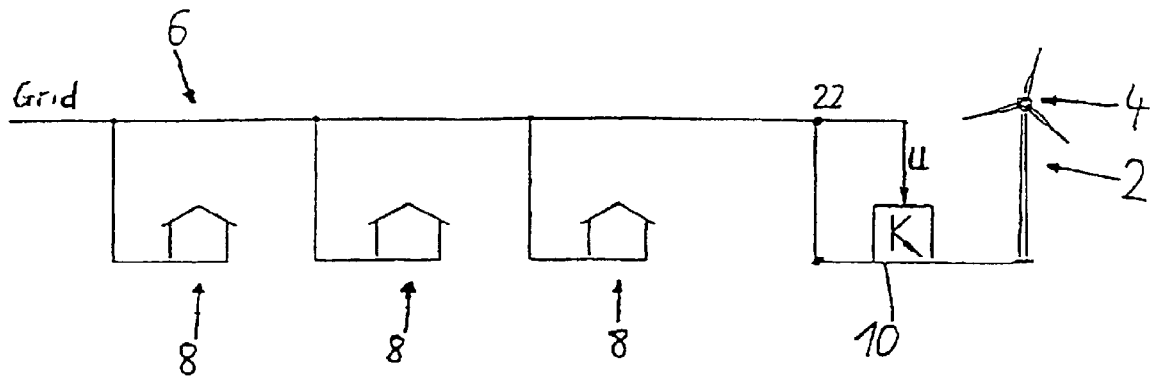
FIG. 1 a wind turbine that feeds power to a grid, in a simplified view.

A wind turbine 2, shown schematically in FIG. 1 and including a rotor 4, is connected to an electric grid 6 that may be a public grid, for example. Several electrical loads 8 are connected to the grid. The electrical generator of wind turbine 2, not shown in FIG. 1, is coupled to an electrical control and regulation device 10 that firstly rectifies the alternating current generated in the generator and subsequently converts the current into an alternating current with a frequency corresponding to the grid frequency. The control and regulation device 10 has a regulating device according to the invention.

At an arbitrary point 22 in grid 6, a voltage sensing device 22 can be provided that returns the respective parameter value to the regulating device 10.

Figure 2:
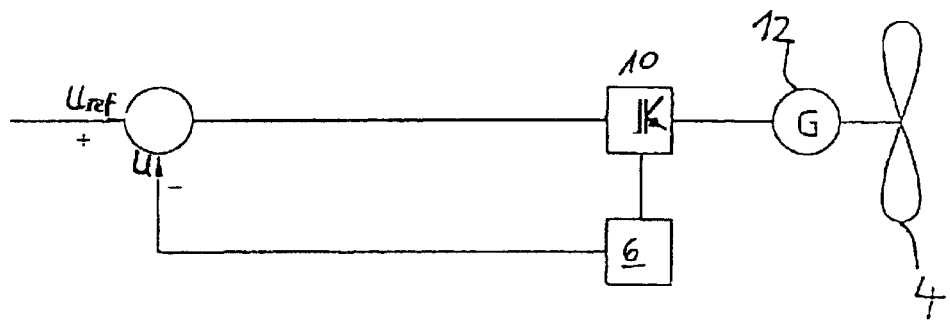
FIG. 2 a control device according to the invention for operating a wind turbine.

FIG. 2 illustrates the regulating device according to the invention. The rotor 4, shown in schematic form, is coupled to a generator 12 that provides an amount of electrical power that may depend on the wind speed. The alternating voltage produced in the generator 12 is initially rectified and subsequently converted into an alternating voltage with a frequency corresponding to the grid frequency.

The grid voltage at a location 22 in grid 6 is measured with a voltage sensor (not shown). Depending on the grid voltage measured, an optimal angle $\phi$ is calculated—if necessary with the help of a microprocessor as shown in FIG. 4.

With the help of the regulating device, the grid voltage U is then adjusted to the desired value $U_{ref}$. By changing the phase angle, the electrical power delivered by generator 12 to grid 6 is regulated.

The view shown in FIG. 3 illustrates the relationship between the voltage in the grid and the phase angle. When the voltage deviates from its reference value $U_{ref}$, which lies between voltage $U_{min}$ and $U_{max}$, the phase angle $\phi$ is changed according to the power curve in the diagram in such a way that either inductive or capacitive non-reactive power is fed to the grid, depending on the polarity of the deviation, in order to stabilize in this way the voltage at the voltage measurement point (22 in FIG. 1).

Figure 4:
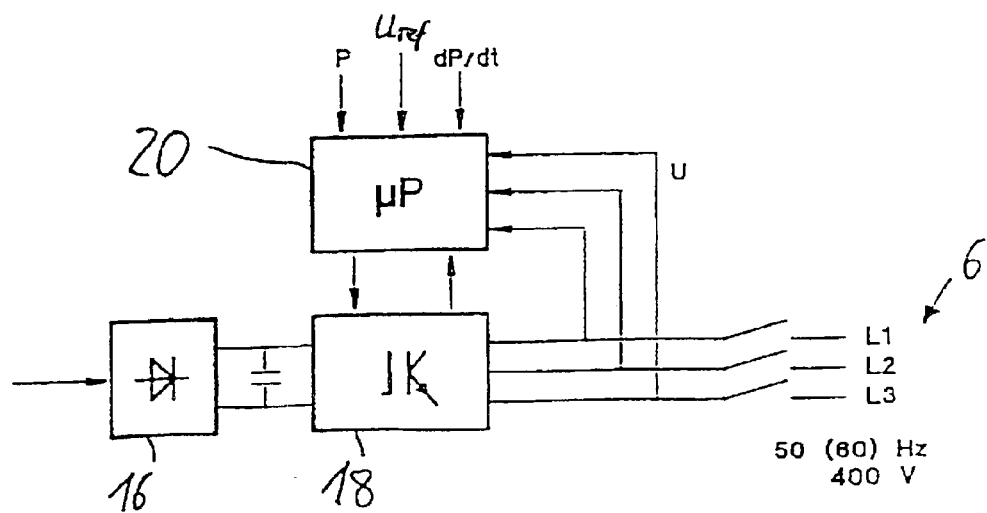
FIG. 4 essential parts of the regulating device shown in FIG. 2.

FIG. 4 shows the principal parts of the control and regulation device 10 in FIG. 1. The control and regulation device 10 includes a rectifier 16, in which the alternating current produced by the generator is rectified. A frequency converter 18 connected to the rectifier 16 converts what is initially rectified direct current into an alternating current that is fed as a three-phase alternating current via lines L1, L2 and L3 into grid 6.

The frequency converter 18 is controlled with the help of a microcontroller 20 that forms part of the complete regulating device. The microprocessor 20 is coupled for this purpose to the frequency converter 18. The input parameters for the microprocessor 20 are the current grid voltage U, the electrical power output P of the generator, the grid voltage reference value $U_{ref}$ and the power gradient dP/dt. The current to be delivered to the grid is changed, pursuant to the invention, in microprocessor 20.

Figure 5:
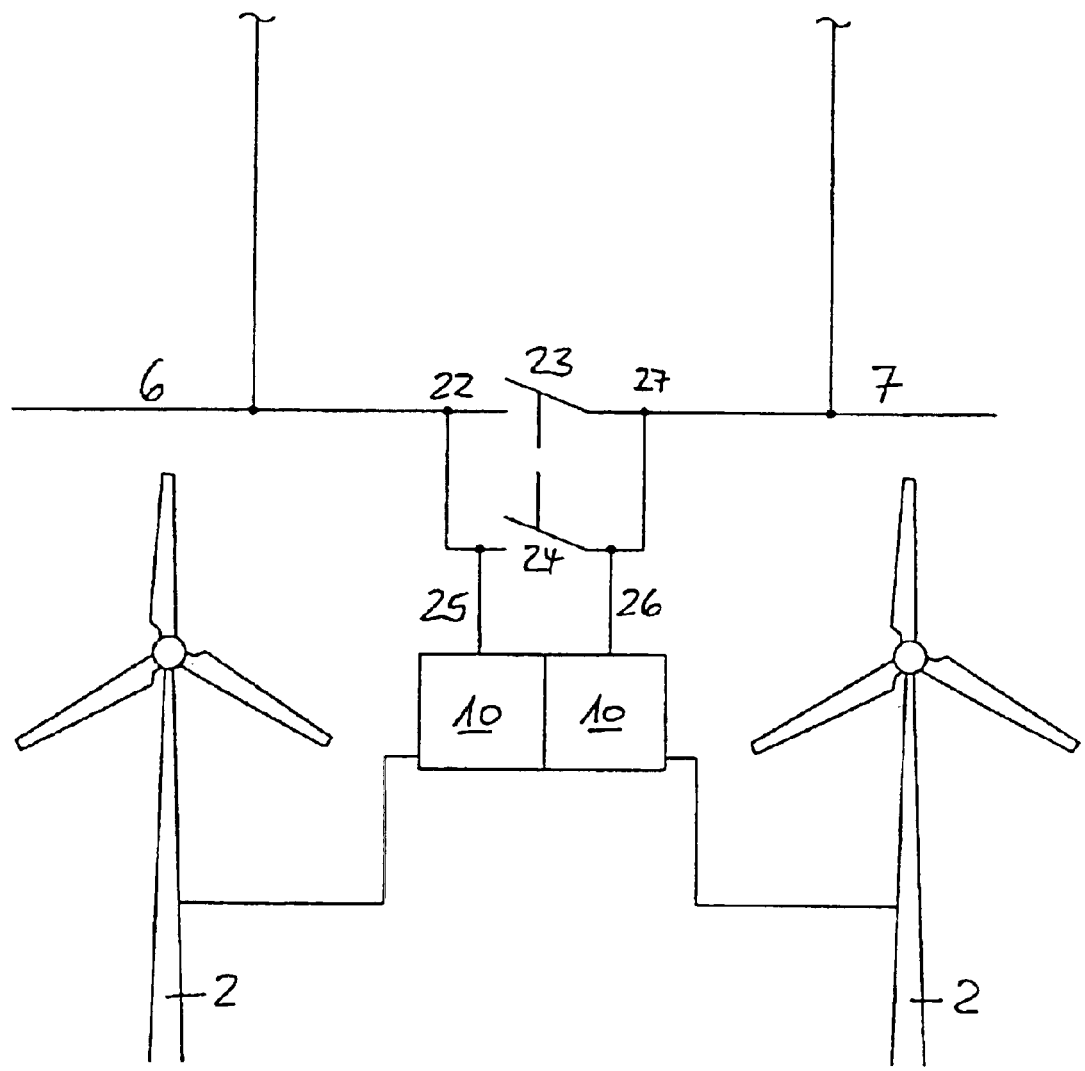
FIG. 5 a simplified view of a common or separate regulation system, depending on the grid situation, for a plurality of wind turbines.

In FIG. 5, two wind turbines 2 are shown as an example for a wind farm. Each of said wind turbines 2, which of course can also stand symbolically for a plurality of wind turbines, is assigned a regulating device 10. At predefined points 22, 27 in grid 6, 7, the regulating device 10 measures the voltage and transmits this value over lines 25, 26 to the respectively assigned regulating device 10.

Portions 6, 7 of the grid can be connected to each other via a switching device 23, or can be disconnected from each other. Parallel to said switching device 23, there is provided a switching device 24 that permits the two regulating devices 10 to be connected to or disconnected from each other, depending on the status of switching device 23.

Thus, if the two portions 6, 7 of the grid are connected to each other, the two regulating devices 10 are also connected to each other, such that the entire grid is viewed as a single entity and supplied as an entity with power from the entire wind farm, the wind park itself being regulated as an entity in response to the voltage at the measurement point 22, 27.

If the two portions 6, 7 of the grid are disconnected by the switching device 23, the regulating devices 10 are also disconnected from each other in such a way that one section of the grid is monitored by the regulating device 10 from a measurement point 22 over line 25, with the assigned section of the wind farm being regulated accordingly, while the other section of power grid 7 is monitored from a measurement point 27 over a line 26 by regulation device 10, which regulates this other section of the wind farm accordingly in order to stabilize the voltage in that portion 7 of the power grid.

Of course, this sub-division need not be limited to two grid portions. This subdivision can extend to a single wind turbine being assigned to a single portion of the grid.

In the event that the regulation system described in the foregoing exhibits a different tolerance range in the measurement of grid parameters than that of the switching device (stepping transformers) already present in the grid, what may happen in certain circumstances is that both devices—the regulator described above, on the one hand, and the switching device, on the other—influence each other in such a way that a kind of "ping-pong" effect ensues, with the stepping transformer switching, for example, thereby modifying the voltage in the grid in such a way that the regulation method according to the invention, as described above, then takes control. Due to the regulation system taking control in this way, the voltage in the grid is changed in such a way that the stepping transformer is activated in turn, and so on.

In order to counteract this undesired "ping-pong" effect, the measurement result from the switching device (e.g. the stepping transformer) can be provided, in a further embodiment of the invention, as an input signal for the regulation device according to the invention. Although this embodiment may possibly involve the disadvantage of the measuring result being less precise, it eliminates the risk of the components continuously and reciprocally influencing each other, and therefore acts to achieve the object of the invention.

The phase angle described in the present application is the angle between the current and the voltage of the electrical power fed to the grid from the generator of the wind turbine. If the phase angle is 0°, only non-reactive power is supplied. If the phase angle is not equal to 0°, a portion of reactive power is also supplied in addition to the non-reactive power, whereby a change in the phase angle does not necessarily imply an increase or decrease in the apparent power; rather, the total apparent power may also remain constant, but with the respective proportions of reactive and non-reactive power changing according to the phase angle that is set.

As described in the foregoing, one object of the invention is to reduce unwanted voltage fluctuations at a predefined point in the grid, or at least to increase them insignificantly when a wind turbine is in operation. To this end, the invention provides that the phase angle of the electrical power to be delivered by the wind turbine (or by the wind farm) can be varied appropriately in order to compensate for voltage fluctuations.

A device that is commonly present in grids to which wind turbines are connected, namely a stepping transformer (not shown), performs essentially the same function. Due to the ability of the stepping transformer to change the power transmission ratio by means of switching operations, the voltage in the grid—or at least on the secondary side of the transformer—can similarly be influenced. However, this is only possible in steps corresponding to the switching steps of the stepping transformer.

Such a stepping transformer commonly has a means of measuring the grid voltage. As soon as this voltage now exceeds or falls below predefined threshold values, a switching operation by the stepping transformer is triggered, with the grid voltage thus being returned to within the predefined range of permissible variation.

The wind turbine embodiment pursuant to the invention, or its inverter, monitors the voltage in the grid and endeavors, with appropriate measures, to keep said voltage within a predefined tolerance range. Since it is certain that these tolerance ranges are not perfectly congruent, a situation can arise in which the wind turbine and the stepping transformer work in opposition to each other, with the stepping transformer stepping upwards and downwards alternately, and the wind turbine alternately endeavoring, in a contrary manner, to decrease and increase the voltage. It is easy to understand that this involve an unacceptable deterioration in the stability of the grid voltage.

In order to avoid the effect just described, the invention therefore teaches, firstly, that the voltage—which is communicated as a measured variable to the wind turbine—is measured at a different point in the grid than the infeed point and/or, secondly, that the regulation system can directly or indirectly actuate a switching device in the grid. Said other point in the grid can be the stepping transformer, of course, such that the inverter is controlled with the same voltage values as the stepping transformer. Firstly, this can avoid the stepping transformer and the inverter counteracting each other with their different tolerances. Secondly, however, the wind turbine can specifically trigger a switching operation in the stepping transformer (indirect actuation) by suitably feeding reactive power into the grid, or bring about such a switching operation (directly) over a control line.

From the perspective of the network operator, it may also be desirable that the wind turbine generates reactive power to be transferred to the other side of the stepping transformer. However, since feeding reactive power always leads to a change in the grid voltage, this would indirectly cause the stepping transformer to be actuated, which is precisely what is not desirable and therefore counter-productive in this situation.

The solution according to the invention consists in suppressing precisely such a switching operation by the stepping transformer, namely upward or downward stepping. Suppressing stepping in this way is what is means by "non-actuation" of the switch, in order to be able in this way to transfer the desired reactive power to the other side of the stepping transformer.

What is claimed is:

1. Method for operating a wind turbine with an electrical generator, drivable by a rotor, for supplying electrical power to an electric grid, in particular to the loads connected thereto, characterized in that the phase angle $\phi$ is changed in response to at least one voltage measured in the grid.

2. Method according to claim 1, characterized in that the phase angle $\phi$ is changed in such a way that the voltage remains substantially unchanged at at least one predefined point in the grid.

3. Method according to one of the preceding claims, characterized in that the voltage is measured at at least one predefined point (22, 27) in the grid.

4. Method according to one of the preceding claims, characterized in that the voltage is measured at a point (22, 27) different from the infeed point.

5. Method according to one of the preceding claims, characterized in that the value to be set for the phase angle $\phi$ is derived from predefined parameter values.

6. Method according to one of the preceding claims, characterized in that the regulation system can directly or indirectly actuate a switching device in the grid.

7. Method according to one of the preceding claims, characterized in that corresponding voltage measurement and regulation can be separately performed for portions of the power grid on the basis of the phase angle $\phi$.

8. Wind farm with at least two wind turbines, characterized by a device (10) for performing the method according to one of the preceding claims and a dedicated voltage sensing device (22, 27) for each separately controllable section of the wind farm.

9. System according to one of the preceding claims, characterized in that the phase angle is capacitively or inductively changed in response to at least one voltage measured in the grid until the voltage acquires a predefined reference value.

10. Wind turbine, characterized by a device (10) for performing the method according to one of the preceding claims.

* * * * *

UNITED STATES PATENT AND TRADEMARK OFFICE
CERTIFICATE OF CORRECTION

PATENT NO.         : 6,965,174 B2
APPLICATION NO. : 10/475731
DATED                 : November 15, 2005
INVENTOR(S)       : Aloys Wobben It is certified that error appears in the above-identified patent and that said Letters Patent is hereby corrected as shown below:

Column 6
Lines 8-13, "Method for operating a wind turbine with an electrical generator, drivable by a rotor, for supplying electrical power to an electric grid, in particular to the loads connected thereto.
   characterized in that the phase angle Ø is changed in response to at least one voltage measured in the grid." should read as --A method for operating a wind turbine with an electrical generator, drivable by a rotor, for supplying electrical power to an electric grid, in particular to loads connected thereto, wherein reactive power is fed into the electrical grid and said reactive power is predetermined by a phase angle Ø describing an angle between the current and the voltage of the electrical power supplied, the phase angle thus determining the proportion of reactive power in the power that is supplied by the wind turbine.
   characterized in that the phase angle Ø is changed response to the amount of at least one voltage measured in the grid, that the phase angle remains unchanged as long as the grid voltage is between a predetermined lower reference value and a predetermined upper reference value, the lower voltage value being less than a reference voltage and the predetermined upper voltage value bring greater than predetermined reference voltage, and that, when the predetermined upper voltage value is exceeded, or the predetermined lower voltage value is undercut, the size of the phase angle increases on any further increase or decrease in the grid voltage.--

Column 6
Lines 14-18, "Method according to claim 1, characterized in that the phase angle Ø is changed in such a way that the voltage remains substantially unchanged at at least one predefined point in the grid." should read as --The method according to claim 1, characterized in that the phase angle Ø is changed in such a way that the voltage remains substantially unchanged at at least one predefined point in the grid.-- was incorrectly recorded as, Column 6
Lines 19-21, "Method according to one of the preceding claims, characterized in that the voltage is measured at at least one predefined point (22, 27) in the grid." should read as --The method according to claim 1, characterized in that the voltage is measured at at least one predefined point. in the grid. --

Column 6
Lines 22-24, "Method according to one of the preceding claims, characterized in that the voltage is measured at a point (22, 27) different from the infeed point." should read as --The method according to claim 1, characterized in that the voltage is measured at a point different from the infeed point. --

UNITED STATES PATENT AND TRADEMARK OFFICE
CERTIFICATE OF CORRECTION

| | |
|---|---|
| PATENT NO. | : 6,965,174 B2 |
| APPLICATION NO. | : 10/475731 |
| DATED | : November 15, 2005 |
| INVENTOR(S) | : Aloys Wobben |

It is certified that error appears in the above-identified patent and that said Letters Patent is hereby corrected as shown below:

Column 6
Lines 25-27, "Method according to one of the preceding claims, characterized in that the value to be set for the phase angle Ø is derived from predefined parameter values." should read as --The method according to claim 1, characterized in that the value to be set for the phase angle Ø is derived from predefined parameter values. --

Column 6
Lines 28-31, "Method according to one of the preceding claims, characterized in that the regulation system can directly or indirectly actuate a switching device in the grid." should read as --The method according to claim 1, characterized in that the regulation system can directly or indirectly actuate a switching device in the grid. --

Column 6
Lines 32-36, "Method according to one of the preceding claims, characterized in that corresponding voltage measurement and regulation can be separately preformed for portions of the power grid on the basis of the phase angle Ø." should read --The method according to claim 1, characterized in that corresponding voltage measurement and regulation can be separately performed for portions of the power grid on the basis of the phase angle Ø.--

Column 6
Lines 37-41, "Wind farm with at least two wind turbines, characterized by a device (10) for performing the method according to one of the preceding claims and a dedicated voltage sensing device (22, 27) for each separately controllable section of the wind farm." should read as --A wind turbine, with an electrical generator drivable by a rotor, for supplying electrical power to an electric grid, in particular to loads connected thereto, wherein reactive power can be fed into the electric grid by means of a frequency converter and said reactive power is predefined by a phase angle Ø that determines the proportion of reactive power supplied by the wind turbine, characterized in that the phase angle Ø can be changed in response to the amount of at least one voltage measured in the grid, that the phase angle remains unchanged as long as the grid voltage is between a predetermined lower voltage value and a predetermined upper voltage value, the lower voltage value being less than the reference grid voltage and the predetermined upper voltage value being greater than the reference grid voltage, and that, when the predetermined upper voltage value is exceeded, or the lower voltage value is undercut, the size of the phase angle increases on any further increase or decrease in the grid voltage.--

UNITED STATES PATENT AND TRADEMARK OFFICE
CERTIFICATE OF CORRECTION

PATENT NO. : 6,965,174 B2
APPLICATION NO. : 10/475731
DATED : November 15, 2005
INVENTOR(S) : Aloys Wobben It is certified that error appears in the above-identified patent and that said Letters Patent is hereby corrected as shown below:

Column 6
Lines 42-46, "System according to one of the preceding claims, characterized in that the phase angle is capacitively or inductively changed in response to at least one voltage measured in the grid until the voltage acquires a predefined reference value." should read as --A wind farm with at least two wind turbines, characterized by a device for performing the method according to claim 1; and
a dedicated voltage sensing device for each separately controllable section of the wind farm.--

Column 6
Lines 47-49, "Wind turbine,
    characterized by a device (10) for performing the method according to one of the preceding claims." should read as --A system according to claim 1, characterized in that the phase angle is capacitively or inductively changed in response to at least one voltage measured in the grid until the voltage acquires a predefined reference value.--

Signed and Sealed this

Eighth Day of August, 2006

JON W. DUDAS
*Director of the United States Patent and Trademark Office*